(12) United States Patent
Sumiya

(10) Patent No.: US 11,738,626 B2
(45) Date of Patent: Aug. 29, 2023

(54) VEHICULAR DOOR DEVICE

(71) Applicant: AISIN CORPORATION, Kariya (JP)

(72) Inventor: Seiichi Sumiya, Kariya (JP)

(73) Assignee: AISIN CORPORATION, Kariya (JP)

( * ) Notice: Subject to any disclaimer, the term of this patent is extended or adjusted under 35 U.S.C. 154(b) by 76 days.

(21) Appl. No.: 17/457,284

(22) Filed: Dec. 2, 2021

(65) Prior Publication Data
US 2022/0185079 A1 Jun. 16, 2022

(30) Foreign Application Priority Data

Dec. 10, 2020 (JP) ................................. 2020-205087

(51) Int. Cl.
*B60J 5/04* (2006.01)

(52) U.S. Cl.
CPC ..................... *B60J 5/047* (2013.01)

(58) Field of Classification Search
CPC ....... B60J 5/047; B60J 5/04; E05Y 2201/488; E05Y 2900/531; E05D 15/101; E05D 15/10; E05F 15/63; E05F 11/54
USPC .............................. 296/146.4, 146.2, 146.12
See application file for complete search history.

(56) References Cited

U.S. PATENT DOCUMENTS

| | | | | |
|---|---|---|---|---|
| 2,348,306 A * | 5/1944 | Parsons | ................... | E05F 15/47 296/117 |
| 4,025,104 A * | 5/1977 | Grossbach | .......... | E05D 15/1081 49/218 |
| 5,867,870 A * | 2/1999 | Kluting | ................... | E05D 5/128 16/257 |
| 6,183,039 B1 * | 2/2001 | Kohut | ................. | E05D 15/1081 296/146.12 |
| 6,447,054 B1 * | 9/2002 | Pietryga | ................. | E05D 3/147 296/146.12 |
| 9,650,826 B2 * | 5/2017 | Potter | ................... | E05F 15/616 |
| 10,190,344 B2 * | 1/2019 | Reddmann | ............ | E05C 17/003 |

(Continued)

FOREIGN PATENT DOCUMENTS

| | | |
|---|---|---|
| JP | 2006-90097 A | 4/2006 |
| JP | 2007-191922 A | 8/2007 |
| JP | 2008-163693 A | 7/2008 |

*Primary Examiner* — Amy R Weisberg
*Assistant Examiner* — Sara Laghlam
(74) *Attorney, Agent, or Firm* — Oblon, McClelland, Maier & Neustadt, L.L.P.

(57) ABSTRACT

A vehicular door device includes a door-side engagement portion including a guide groove that includes a pair of side wall portions facing each other in a vehicle width direction and extends in an opening-closing operation direction of the door, a vehicle body-side engagement portion including a shaft-shaped engagement portion extending in an up-down direction of a vehicle, and an expansion mechanism provided in a second link arm. In an opening-closing operation position near a full closed position of the door where the door-side engagement portion and the vehicle body-side engagement portion engage with each other, the shaft-shaped engagement portion is disposed in the guide groove. The shaft-shaped engagement portion is relatively displaced along an extending direction of the guide groove while a change in length of the second link arm, based on an operation of the expansion mechanism, is accompanied, and thus the door can perform an opening-closing operation.

8 Claims, 11 Drawing Sheets

(56) References Cited

U.S. PATENT DOCUMENTS

| | | | | |
|---|---|---|---|---|
| 2014/0144261 A1* | 5/2014 | Sasaki | ................... | E05F 15/611 |
| | | | | 74/89 |
| 2015/0021931 A1* | 1/2015 | Konchan | ................. | E05B 77/48 |
| | | | | 49/506 |
| 2023/0101291 A1* | 3/2023 | Dosenbach | ............... | E05D 3/06 |
| | | | | 49/70 |

* cited by examiner

F I G. 11
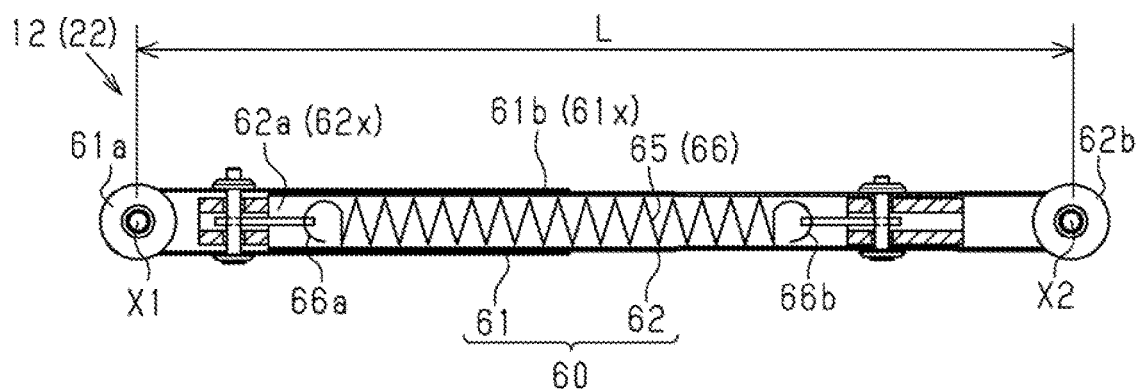
F I G. 12
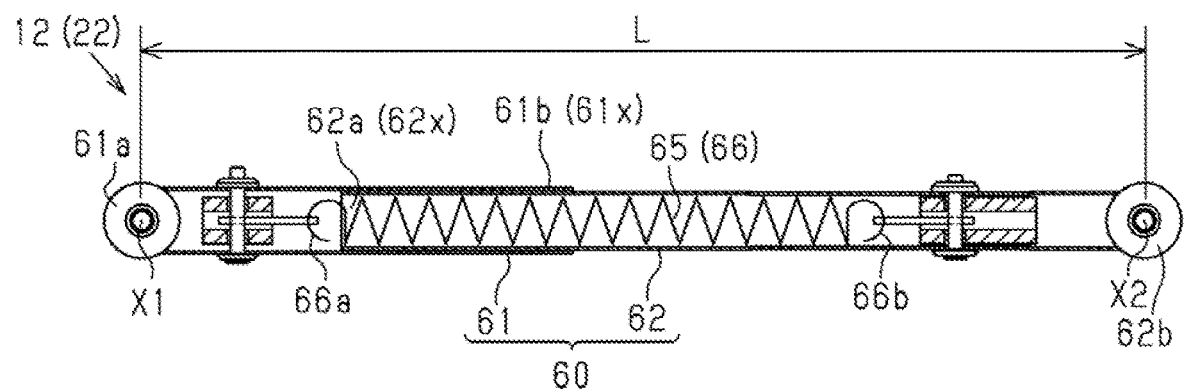

VEHICULAR DOOR DEVICE

CROSS REFERENCE TO RELATED APPLICATIONS

This application is based on and claims priority under 35 U.S.C. § 119 to Japanese Patent Application 2020-205087, filed on Dec. 10, 2020, the entire content of which is incorporated herein by reference.

TECHNICAL FIELD

This disclosure generally relates to a vehicular door device.

BACKGROUND DISCUSSION

There has conventionally been a vehicular door device including a first link arm and a second link arm that include a first rotary coupling point with respect to a vehicle body, and a second rotary coupling point with respect to a door of a vehicle. In such a vehicular door device, the door provided on a door opening performs an opening-closing operation, based on an operation of a link mechanism formed of the first link arm and the second link arm. Further, for example, JP2006-90097A (Reference 1) describes a configuration in which each link arm forming the link mechanism is stored in a position outside a door opening mounted on a terminal portion of a vehicle body-side portion and inside a weather strip mounted on an in-vehicle side of a door when the door is in a closed state. Then, for example, JP2008-163693A (Reference 2) discloses a configuration in which such a link mechanism formed of each link arm is combined with a structure in which a guide rail on a vehicle body side and a guide roller unit on a door side engage with each other.

However, in a configuration of supporting a door of a vehicle on a vehicle body via a link mechanism formed of first and second link arms as described above, the first and second link arms are more likely to be brought closer and be linearly aligned when an opening-closing operation position of the door is located near a full closed position. Thus, there is a problem that it is difficult to stably support the door.

A need thus exists for a vehicular door device which is not susceptible to the drawback mentioned above.

SUMMARY

A vehicular door device that solves the problem described above includes a first link arm and a second link arm that include a first rotary coupling point with respect to a vehicle body and a second rotary coupling point with respect to a door of a vehicle, a door-side engagement portion provided on a closed-side end portion of the door that opens and closes a door opening of the vehicle, based on an operation of a link mechanism formed of the first link arm and the second link arm, a vehicle body-side engagement portion provided on a closed-side end portion of the door opening to and from which the closed-side end portion of the door is brought closer and away, based on an opening-closing operation of the door, and an expansion mechanism provided in at least any of the first link arm and the second link arm, and configured to change a length between the first rotary coupling point and the second rotary coupling point. One of the door-side engagement portion and the vehicle body-side engagement portion includes a shaft-shaped engagement portion extending in an up-down direction of the vehicle. The other of the door-side engagement portion and the vehicle body-side engagement portion includes a guide groove that includes a pair of side wall portions facing each other in a vehicle width direction and extends in an opening-closing operation direction of the door. In an opening-closing operation position near a full closed position of the door where the door-side engagement portion and the vehicle body-side engagement portion engage with each other, the shaft-shaped engagement portion is disposed in the guide groove, and the shaft-shaped engagement portion is also relatively displaced along an extending direction of the guide groove while a change in length between the first rotary coupling point and the second rotary coupling point, based on an operation of the expansion mechanism, is accompanied, and thus the door is configured to perform an opening-closing operation.

BRIEF DESCRIPTION OF THE DRAWINGS

The foregoing and additional features and characteristics of this disclosure will become more apparent from the following detailed description considered with the reference to the accompanying drawings, wherein:

FIG. 11 is a cross-sectional view of the second link arm provided with an expansion mechanism;
FIG. 12 is a cross-sectional view of the second link arm provided with the expansion mechanism.

DETAILED DESCRIPTION

Figure 1:
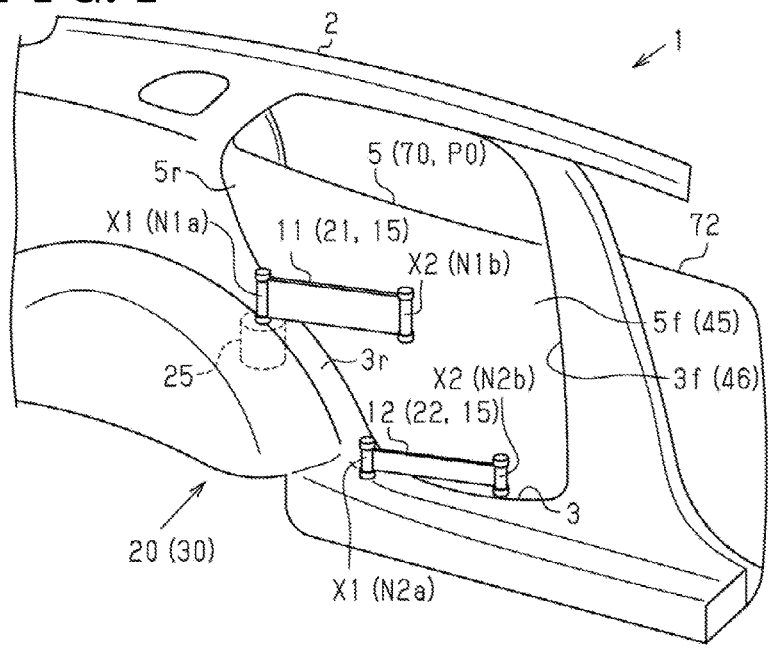
FIG. 1 is a perspective view of a vehicular door device.
Figure 2:
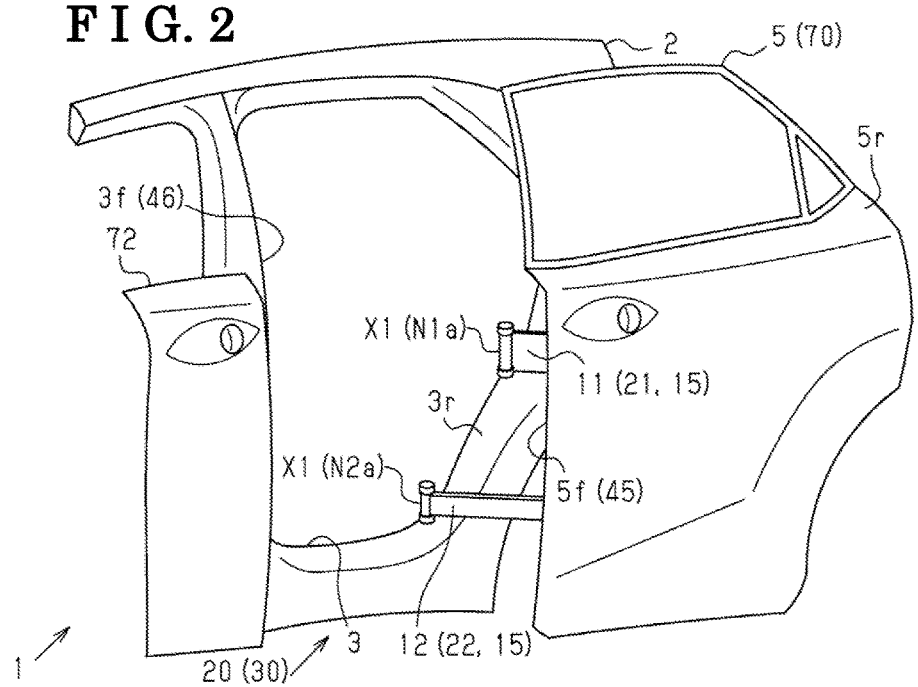
FIG. 2 is a perspective view of the vehicular door device.

Hereinafter, one embodiment of a vehicular door device will be described with reference to the drawings. As illustrated in FIGS. 1 and 2, a vehicle 1 according to the present embodiment has a door opening 3 provided on a side surface of a vehicle body 2. Then, the door opening 3 is provided with a first link arm 11 and a second link arm 12 that support a door 5 of the vehicle 1 on the door opening 3.

For detailed description, in the vehicle 1 according to the present embodiment, the first and second link arms 11 and 12 each include a first rotary coupling point X1 with respect to the vehicle body 2 and a second rotary coupling point X2 with respect to the door 5. Specifically, the first link arm 11 is coupled to the vehicle body 2 while the first link arm 11 is supported by a support shaft N1a extending in an up-down direction (up-down direction in each diagram), and is also coupled to the door 5 while the first link arm 11 is supported by a support shaft N1b extending in the up-down direction. Then, the second link arm 12 is coupled to the vehicle body 2 while the second link arm 12 is supported by a support shaft N2a extending in the up-down direction, and is also coupled to the door 5 while the second link arm 12 is supported by a support shaft N2b extending in the up-down direction.

Figure 3:
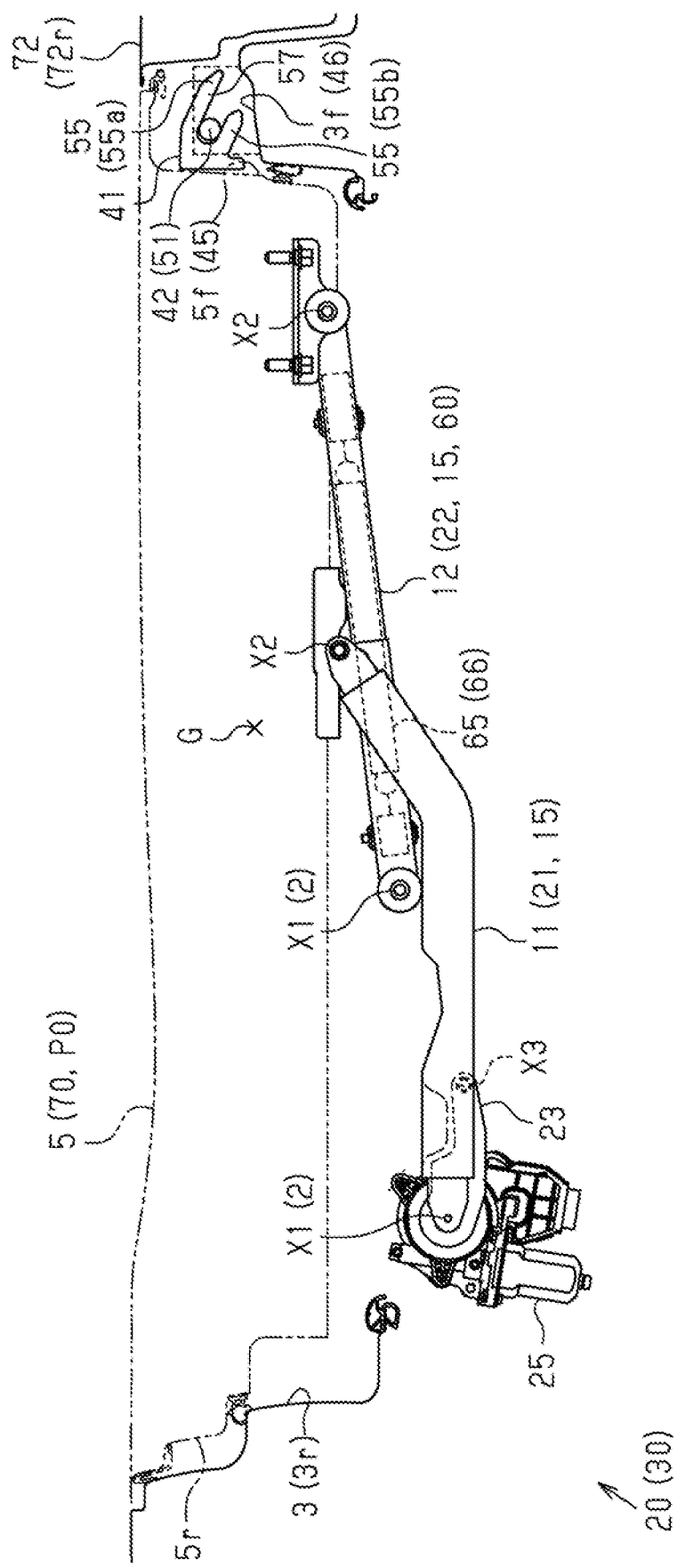
FIG. 3 is a plan view of a first link arm and a second link arm forming a link mechanism.
Figure 4:
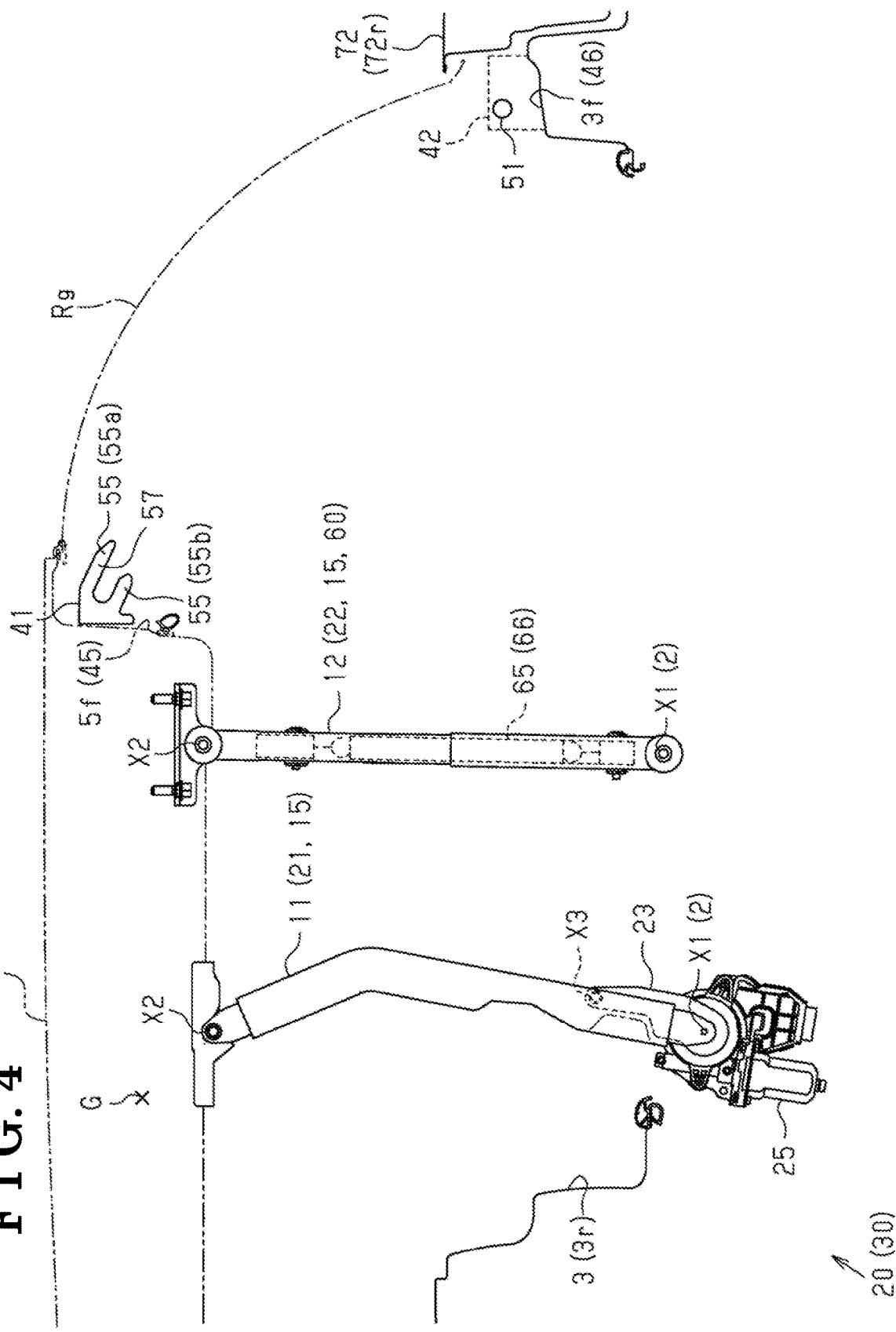
FIG. 4 is a plan view of the first link arm and the second link arm forming the link mechanism.
Figure 5:
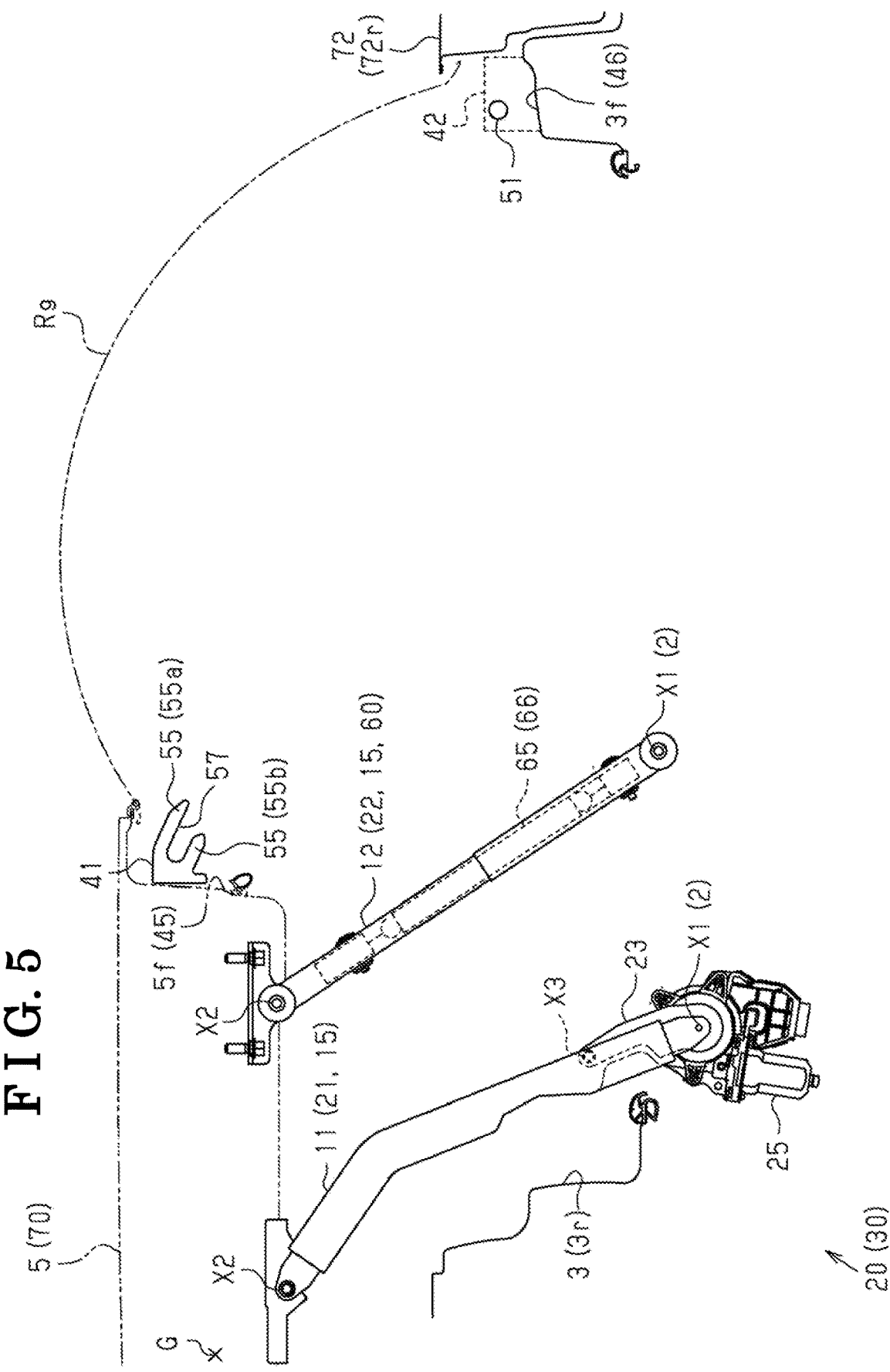
FIG. 5 is a plan view of the first link arm and the second link arm forming the link mechanism.

In other words, as illustrated in FIGS. 3 to 5, in the vehicle 1 according to the present embodiment, the first and second link arms 11 and 12 form a link mechanism 15 having a configuration as a four-bar link. Then, in the vehicle 1 according to the present embodiment, the door 5 supported by the door opening 3 is configured to perform an opening-closing operation, based on an operation of the link mechanism 15.

For more detailed description, as illustrated in FIGS. 1 and 2, in the vehicle 1 according to the present embodiment, the door 5 is supported by the door opening 3 on a vehicle rear side (left side in FIG. 1 and right side in FIG. 2) by using the first and second link arms 11 and 12. In the vehicle 1 according to the present embodiment, the first and second link arms 11 and 12 each include, at a rear edge portion 3r of the door opening 3, the first rotary coupling point X1 rotatably coupled to the vehicle body 2. Further, in the vehicle 1 according to the present embodiment, the first link arm 11 is provided above the second link arm 12. Furthermore, the first link arm 11 includes, in a substantially central position in a front-rear direction of the door 5, the second rotary coupling point X2 rotatably coupled to the door 5, and the second link arm 12 includes, near a front end portion 5f of the door 5, the second rotary coupling point X2 coupled to the door 5. Then, in this way, in the vehicle 1 according to the present embodiment, a vehicular door device 20 in which the door 5 performs the opening-closing operation, based on an operation of the link mechanism 15 formed of the first and second link arms 11 and 12, is formed.

Specifically, as illustrated in FIGS. 3 to 5, in the vehicular door device 20 according to the present embodiment, the first and second link arms 11 and 12 rotate about the first rotary coupling point X1 in a counterclockwise direction in each diagram, and thus the door 5 of the vehicle 1 supported by the first and second link arms 11 and 12 performs an opening operation toward the vehicle rear side (left side in each diagram). Then, the first and second link arms 11 and 12 rotate about the first rotary coupling point X1 in a clockwise direction in each diagram, and thus the door 5 supported by the first and second link arms 11 and 12 is configured to perform a closing operation toward a vehicle front side (right side in each diagram).

Further, in the vehicular door device 20 according to the present embodiment, a track of the opening-closing operation of the door 5 is defined based on an operation of the link mechanism 15 formed of the first and second link arms 11 and 12. In other words, as illustrated in FIG. 4, a movement component in the vehicle front-rear direction increases in a middle position where the first and second link arms 11 and 12 extend in a vehicle width direction (up-down direction in FIGS. 3 to 5). Then, as illustrated in FIG. 3, a movement component in the vehicle width direction further increases by the first and second link arms 11 and 12 extending in the vehicle front-rear direction (left-right direction in FIGS. 3 to 5) as an opening-closing operation position of the door 5 is closer to a full closed position P0.

Furthermore, as illustrated in FIGS. 1 to 5, in the vehicular door device 20 according to the present embodiment, the first link arm 11 includes the second rotary coupling point X2 coupled to the door 5 in a position closer to a center of gravity G than the second link arm 12. Then, in this way, in the vehicular door device 20 according to the present embodiment, for a support function of supporting a load on the door 5, the first link arm 11 is configured to serve as a main link 21 that supports a greater door load, and the second link arm 12 is configured to serve as a sub-link 22 in which the door load acting is relatively small.

Note that, in the vehicular door device 20 according to the present embodiment, the first link arm 11 has a diameter larger than that of the second link arm 12. Then, in this way, the vehicular door device 20 is configured to provide a high degree of support rigidity to the first link arm 11 positioned as the main link 21.

Figure 6:
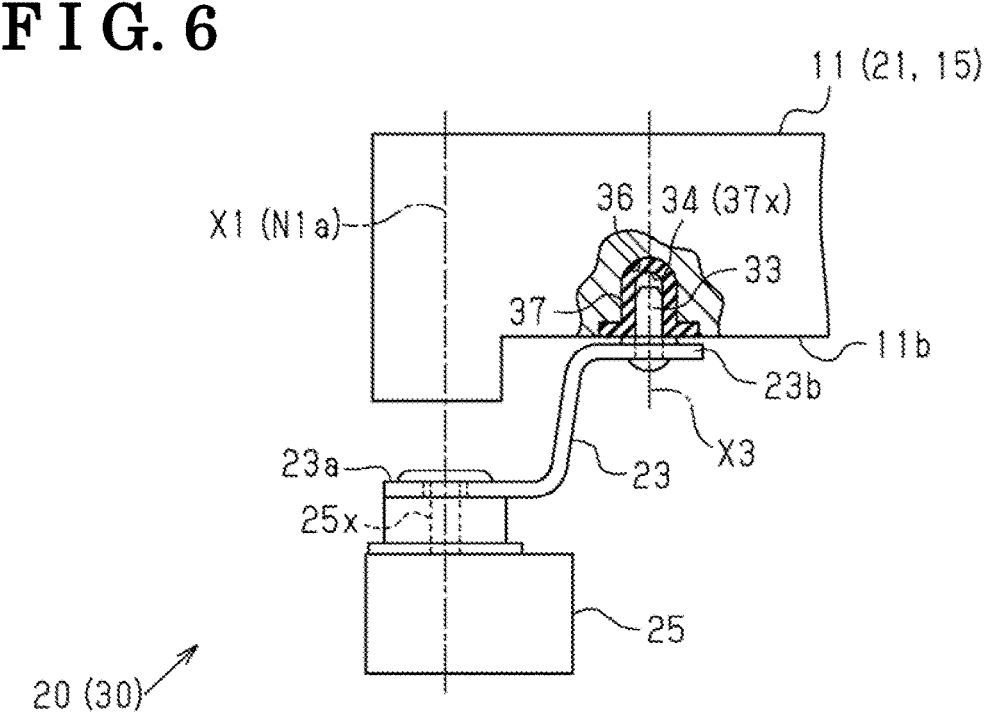
FIG. 6 is a side view of a driving arm coupled to the first link arm, and an actuator.
Figure 7:
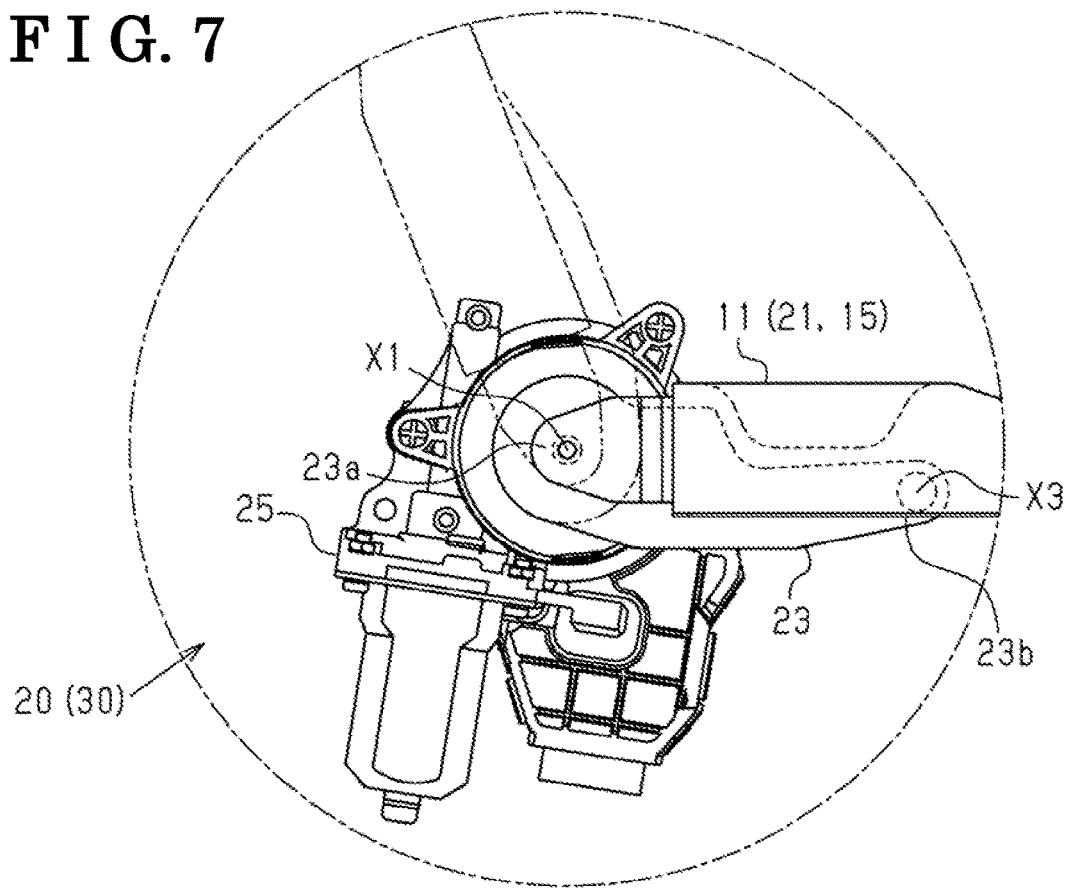
FIG. 7 is a plan view of the driving arm coupled to the first link arm, and the actuator.

Further, as illustrated in FIGS. 6 and 7, the vehicular door device 20 according to the present embodiment includes, in a position between the first rotary coupling point X1 and the second rotary coupling point X2, a driving arm 23 rotatably coupled to the first link arm 11 positioned as the main link 21. Furthermore, the vehicular door device 20 includes an actuator 25 that drives the link mechanism 15 by providing a driving force to the driving arm 23 to rotate the driving arm 23. Then, in this way, the vehicular door device 20 according to the present embodiment has a configuration as a power door device 30 capable of causing the door 5 to perform the opening-closing operation, based on a driving force of the actuator 25.

Specifically, in the vehicular door device 20 according to the present embodiment, a coupling position of the driving arm 23 with respect to the first link arm 11, i.e., a third rotary coupling point X3 in the first link arm 11 is set in a position closer to the first rotary coupling point X1 than the second rotary coupling point X2 (see FIGS. 3 to 5). Further, the actuator 25 according to the present embodiment is fixed to the vehicle body 2 in a position below the first link arm 11. Furthermore, in the vehicle 1 according to the present embodiment, the actuator 25 is disposed in a position in which an output shaft 25x of the actuator 25 is substantially coaxial with the first rotary coupling point X1. Then, the vehicular door device 20 according to the present embodiment is configured to couple one end side of the driving arm 23 disposed in parallel with the first link arm 11 to the output shaft 25x of the actuator 25.

In other words, in the vehicular door device 20 according to the present embodiment, the first link arm 11 and the second link arm 12 rotate in conjunction with the rotation of the driving arm 23, based on a driving force of the actuator 25. Then, in this way, in the vehicular door device 20 according to the present embodiment, the door 5 is configured to perform the opening-closing operation, based on an operation of the link mechanism 15 formed of the first and second link arms 11 and 12.

For more detailed description, a first end portion 23a of the driving arm 23 according to the present embodiment is coupled to the output shaft 25x of the actuator 25 in such a way that the first end portion 23a is not relatively rotatable. Further, the driving arm 23 includes a protruding engagement portion 33 provided on a second end portion 23b of the driving arm 23 and protruding upward. Furthermore, the first link arm 11 includes a recessed engagement portion 34 provided on a lower surface 11b. Then, in the vehicular door device 20 according to the present embodiment, the protruding engagement portion 33 of the driving arm 23 engages with the recessed engagement portion 34 provided on the first link arm 11, and thus the third rotary coupling point X3 is formed.

Specifically, in the vehicular door device 20 according to the present embodiment, the protruding engagement portion 33 on the driving arm 23 side has a shaft shape, specifically, a pin shape that penetrates the second end portion 23b of the driving arm 23. Further, the recessed engagement portion 34 on the first link arm 11 side is formed by attaching a bush 37 having a long hole 37x to a recessed attachment portion 36 provided on the lower surface 11b of the first link arm 11. Furthermore, the bush 37 is formed by using a soft material such as resin, rubber, or an elastomer, for example. Then, in this way, the vehicular door device 20 according to the present embodiment is configured to suppress hitting sound generated by contact between the first link arm 11 and the driving arm 23, and secure a high degree of quietness.

(Holding Structure of Door Near Full Closed Position)

Next, a holding structure of the door 5 near the full closed position P0 in the vehicular door device 20 according to the present embodiment will be described.

As illustrated in FIGS. 3 to 5 and 8, the vehicular door device 20 according to the present embodiment includes a door-side engagement portion 41 provided on the front end portion 5f of the door 5. Further, the vehicular door device 20 includes a vehicle body-side engagement portion 42 provided on a front edge portion 3f of the door opening 3. In other words, in the vehicle 1 according to the present embodiment, the door-side engagement portion 41 is provided on a closed-side end portion 45 located on the closing operation side of the door 5 that opens and closes the door opening 3 of the vehicle 1, based on an operation of the link mechanism 15 formed of the first and second link arms 11 and 12. Then, the vehicle body-side engagement portion 42 is provided on a closed-side end portion 46 of the door opening 3 to and from which the closed-side end portion 45 of the door 5 is brought closer/away, i.e., closer or away, based on the opening-closing operation of the door 5 that moves in the vehicle front-rear direction.

Figure 9:
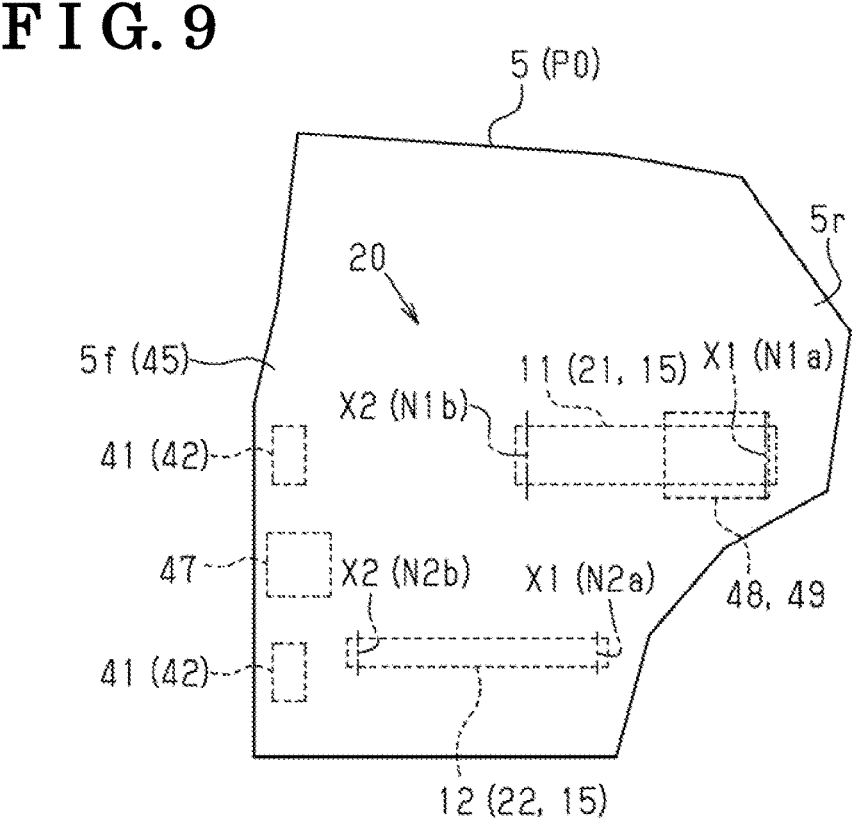
FIG. 9 is an explanatory diagram illustrating an arrangement of the door-side engagement portion and the vehicle body-side engagement portion.

Specifically, as illustrated in FIG. 9, the door 5 according to the present embodiment is provided with a front lock 47 and a rear lock 48 having a configuration as a full closed lock that holds the door 5 in the full closed position. Note that the rear lock 48 according to the present embodiment is integrally provided with a closer device 49 for moving a latch mechanism provided on the front lock 47 and the rear lock 48 from a half latched state to a full latched state, and from the full latched state to an unlatched state. Further, the vehicular door device 20 according to the present embodiment includes the door-side engagement portions 41 and 41 provided on the front end portion 5f of the door 5 in two positions separated in the up-down direction across the front lock 47. Furthermore, the vehicular door device 20 includes the vehicle body-side engagement portions 42 and 42 provided on the front edge portion 3f of the door opening 3 similarly in two positions separated in the up-down direction. Then, the vehicular door device 20 according to the present embodiment is configured to hold the door 5 in the full closed position P0 while the door-side engagement portions 41 and 41 and the vehicle body-side engagement portions 42 and 42 engage with each other.

Figure 8:
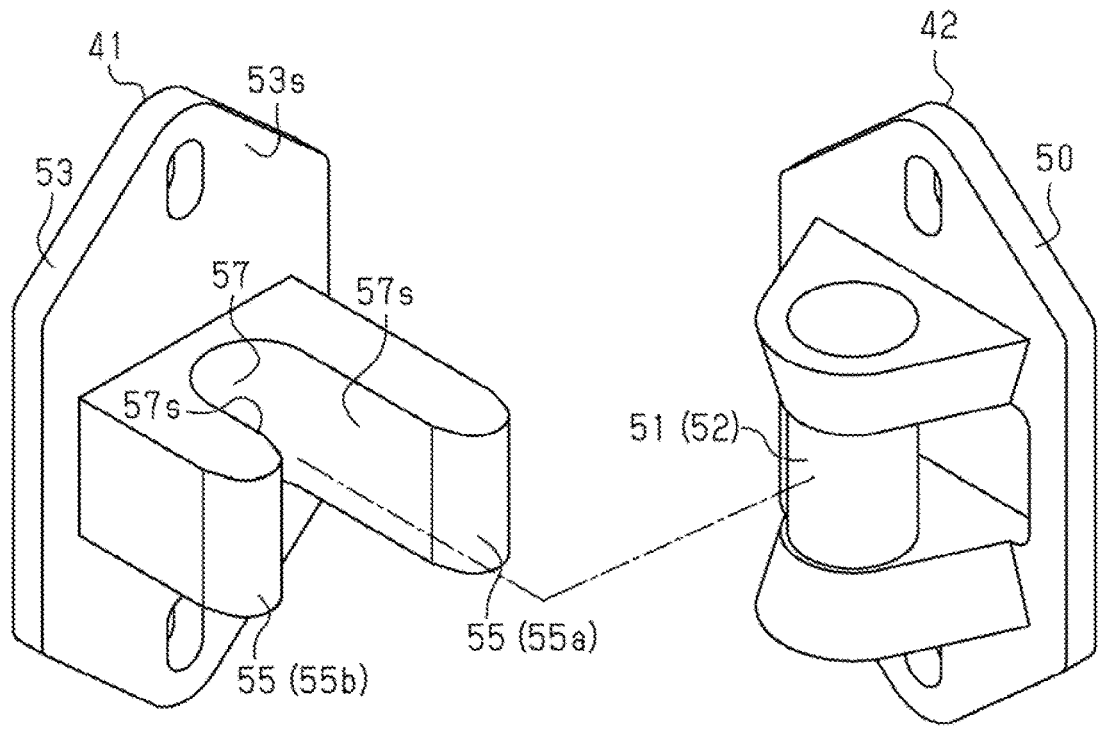
FIG. 8 is a perspective view of a door-side engagement portion and a vehicle body-side engagement portion.
Figure 10:
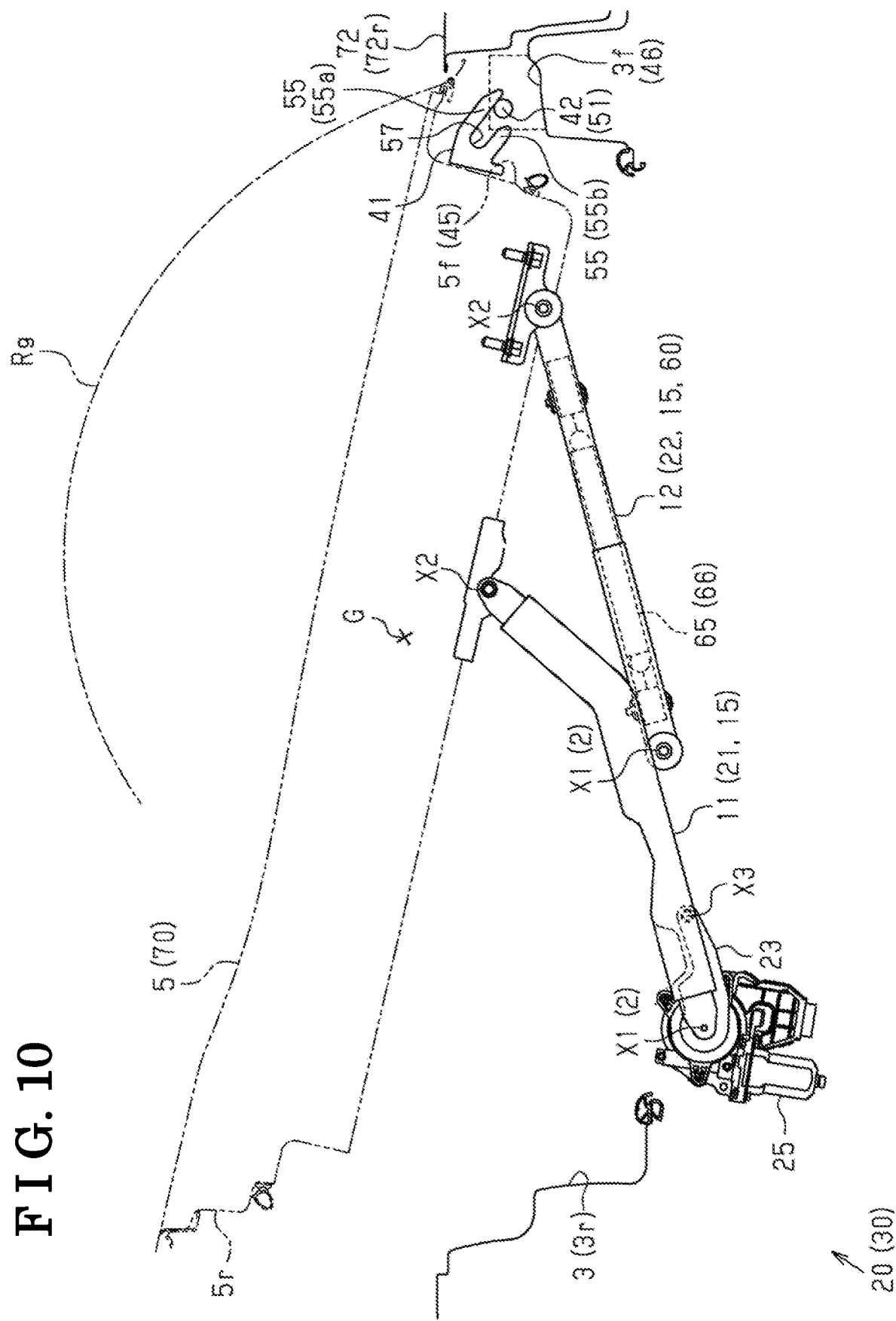
FIG. 10 is a plan view of the first link arm and the second link arm forming the link mechanism.

For detailed description, as illustrated in FIGS. 8 and 10, the vehicle body-side engagement portion 42 according to the present embodiment includes a fixing portion 50 with respect to the vehicle body 2, and a shaft-shaped engagement portion 51 supported by the fixing portion 50. Specifically, in the vehicle body-side engagement portion 42 according to the present embodiment, the shaft-shaped engagement portion 51 has a configuration as a roller 52 rotatably supported by the fixing portion 50. Then, the vehicle body-side engagement portion 42 according to the present embodiment is configured in such a way that the fixing portion 50 is fastened with respect to the front edge portion 3f of the door opening 3 while the shaft-shaped engagement portion 51 extends in the up-down direction of the vehicle 1.

On the other hand, the door-side engagement portion 41 according to the present embodiment includes a fixing portion 53 with respect to the door 5, and two engagement claws 55 and 55 supported by the fixing portion 53. In the door-side engagement portion 41 according to the present embodiment, the fixing portion 53 has an outer shape having a substantially flat plate shape. Further, each of the engagement claws 55 and 55 is provided in a manner in which the engagement claws 55 and 55 are aligned and protrude from a surface 53s of the fixing portion 53. Then, the door-side engagement portion 41 according to the present embodiment is configured in such a way that the fixing portion 53 is fastened with respect to the front edge portion 5f of the door 5 while the engagement claws 55 and 55 are aligned in the vehicle width direction.

In other words, in the door-side engagement portion 41 according to the present embodiment, a guide groove 57 extending in an opening-closing operation direction of the door 5 is formed between the two engagement claws 55 and 55. Then, the vehicular door device 20 according to the present embodiment is configured in such a way that the door-side engagement portion 41 and the vehicle body-side engagement portion 42 engage with each other while the shaft-shaped engagement portion 51 is disposed in the guide groove 57 when the door 5 is located near the full closed position P0.

Specifically, in the door-side engagement portion 41 according to the present embodiment, the two engagement claws 55 and 55 serve as both side wall portions 57s and 57s of the guide groove 57. Furthermore, the shaft-shaped engagement portion 51 of the vehicle body-side engagement portion 42 is disposed in the guide groove 57 while the shaft-shaped engagement portion 51 is sandwiched between a pair of the side wall portions 57s and 57s facing each other in the vehicle width direction. Then, in this way, by regulating displacement of the door 5 in the vehicle width direction, the vehicular door device 20 according to the present embodiment is configured to be able to stably support the door 5 even in the opening-closing operation position near the full closed position P0 where the first and second link arms 11 and 12 are more likely to be linearly aligned.

Further, as illustrated in FIGS. 11 and 12, in the vehicular door device 20 according to the present embodiment, the second link arm 12 positioned as the sub-link 22 is provided with an expansion mechanism 60 capable of changing a length L between the first and second rotary coupling points X1 and X2.

For detailed description, the second link arm 12 includes an outer tube 61 and an inner tube 62 disposed concentrically. Specifically, the outer tube 61 includes, on a first end portion 61a side, the first rotary coupling point X1 with respect to the vehicle body 2, and also includes an opening 61x on a second end portion 61b side. Further, the inner tube 62 includes, on a second end portion 62b side, the second rotary coupling point X2 with respect to the door 5, and also includes an opening 62x on a first end portion 62a side. Furthermore, an inside diameter of the outer tube 61 is set to a value greater than an outer diameter of the inner tube 62. Then, in this way, the second link arm 12 is configured in such a way that the outer tube 61 and the inner tube 62 are disposed concentrically by inserting the first end portion 62a side of the inner tube 62 into the tube of the outer tube 61 from the second end portion 61b side.

In other words, in the vehicular door device 20 according to the present embodiment, the outer tube 61 and the inner tube 62 are relatively displaced in an axial direction, and thus the expansion mechanism 60 provided in the second link arm 12 is formed. Specifically, the outer tube 61 and the inner tube 62 are relatively displaced in a direction in which the inner tube 62 is pulled out of the tube of the outer tube 61, and thus the length L between the first and second rotary coupling points X1 and X2 is increased. Then, the outer tube 61 and the inner tube 62 are relatively displaced in a direction in which the inner tube 62 is put into the tube of the outer tube 61, and thus the length L between the first and second rotary coupling points X1 and X2 is shortened.

Further, in the vehicular door device 20 according to the present embodiment, the expansion mechanism 60 includes a biasing member 65 that provides a tensile force in a direction of reducing the length L between the first and second rotary coupling points X1 and X2. Specifically, in the tube of the outer tube 61 and the inner tube 62 forming the second link arm 12, a tensile spring 66 including an engagement portion 66a with respect to the outer tube 61 and an engagement portion 66b with respect to the inner tube 62 is provided. Then, the vehicular door device 20 according to the present embodiment is configured to provide, to the second link arm 12, a tensile force in the direction of reducing the length L between the first and second rotary coupling points X1 and X2, based on an elastic force of the tensile spring 66.

Figure 13:
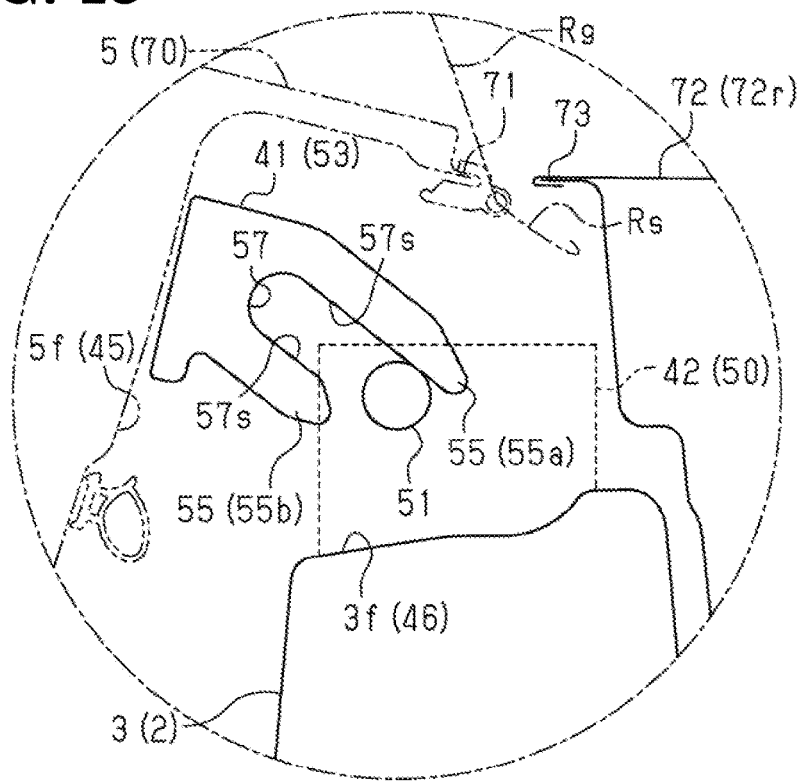
FIG. 13 is an enlarged view near the door-side engagement portion and the vehicle body-side engagement portion.

For more detailed description, as illustrated in FIGS. 8 and 13, in the vehicular door device 20 according to the present embodiment, among the two engagement claws 55 and 55 constituting the door-side engagement portion 41, an outer engagement claw 55a disposed outside in the vehicle width direction has a protruding amount greater than that of an inner engagement claw 55b disposed inside in the vehicle width direction. In other words, the outer engagement claw 55a is longer than the inner engagement claw 55b. Then, in this way, the vehicular door device 20 according to the present embodiment is configured in such a way that the shaft-shaped engagement portion 51 of the vehicle body-side engagement portion 42 provided on the closed-side end portion 46 of the door opening 3 can smoothly engage with the guide groove 57 of the door-side engagement portion 41 provided on the closed-side end portion 45 of the door 5 that performs the closing operation by making an arc-shaped glide track Rg (see FIG. 5).

Figure 14:
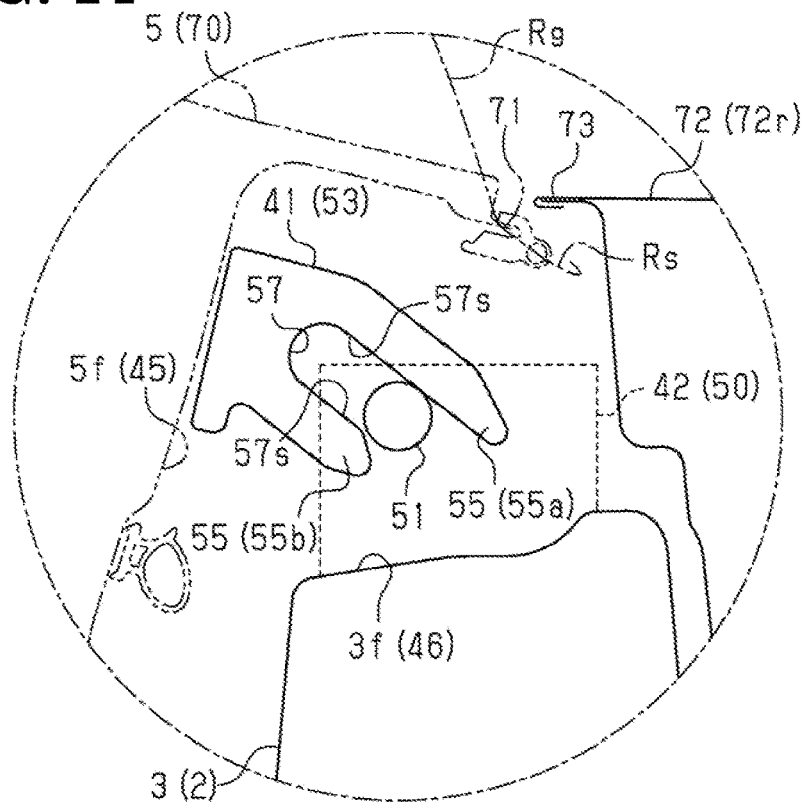
FIG. 14 is an enlarged view near the door-side engagement portion and the vehicle body-side engagement portion.
Figure 15:
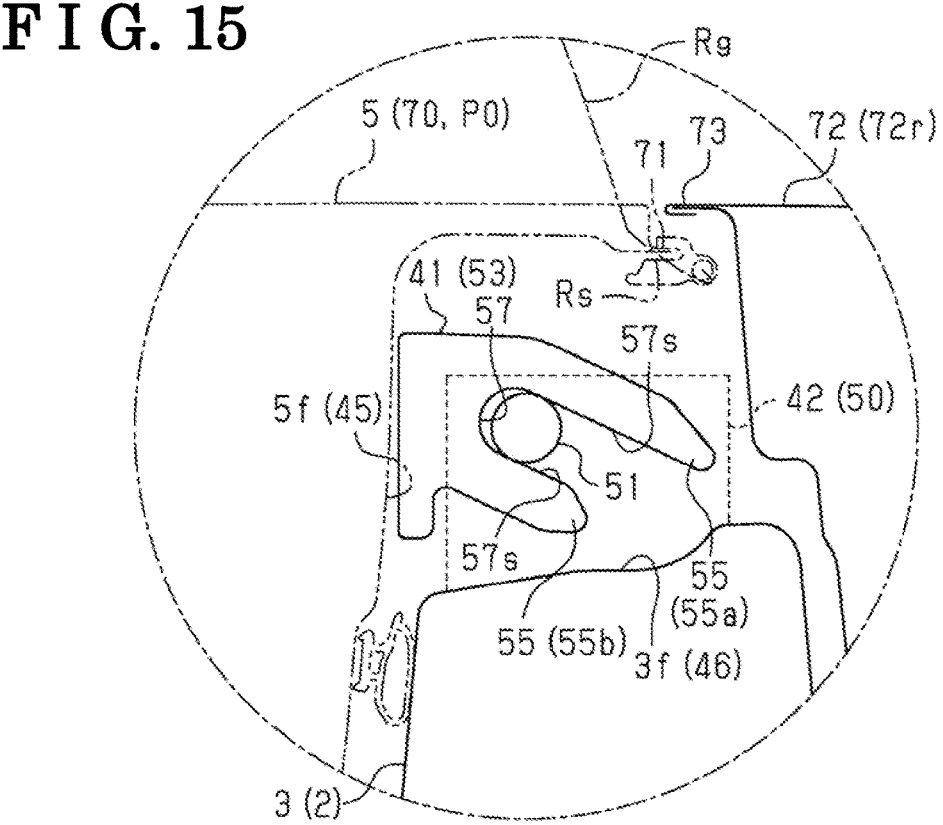
FIG. 15 is an enlarged view near the door-side engagement portion and the vehicle body-side engagement portion.

Further, as illustrated in FIGS. 13 to 15, in the vehicular door device 20 according to the present embodiment, the opening-closing operation of the door 5 is permitted while the door-side engagement portion 41 and the vehicle body-side engagement portion 42 engage with each other, based on an operation of the expansion mechanism 60 provided in the second link arm 12. In other words, the length L between the first and second rotary coupling points X1 and X2 in the second link arm 12 changes based on an operation of the expansion mechanism 60, and thus a posture of the door 5 supported by the link mechanism 15 formed of the first and second link arms 11 and 12 changes. Furthermore, at this time, the shaft-shaped engagement portion 51 on the vehicle body-side engagement portion 42 side disposed in the guide groove 57 between the two engagement claws 55 and 55 constituting the door-side engagement portion 41 seemingly slides while rotating along an extending direction of each of the engagement claws 55 and 55 sandwiching the shaft-shaped engagement portion 51 in the vehicle width direction, i.e., an extending direction of the guide groove 57, based on the configuration as the roller 52. Then, the vehicular door device 20 according to the present embodiment is configured in such a way that the door 5 provided with the door-side engagement portion 41 performs the opening-closing operation in a manner in which the front end portion 5f side of the door 5 moves in the vehicle front-rear direction, based on relative displacement of the shaft-shaped engagement portion 51 disposed in the guide groove 57 formed between the engagement claws 55 and 55, and the rear end portion 5r side of the door 5 also moves in the vehicle width direction.

Specifically, as illustrated in FIGS. 10 and 13, for example, during the closing operation of the door 5 moving toward the full closed position P0, when the door 5 is located in the opening-closing operation position where the door-side engagement portion 41 and the vehicle body-side engagement portion 42 engage with each other, the door 5 has an inclined posture in which the rear end portion 5r side protrudes outside in the vehicle width direction (upper side in each diagram) further than the front end portion 5f side.

Further, as illustrated in FIGS. 13 to 15, by providing a driving force of the actuator 25 or a manual operation force in a direction in which the door 5 performs the closing operation while the door-side engagement portion 41 and the vehicle body-side engagement portion 42 engage with each other, the expansion mechanism 60 provided in the second link arm 12 extends against an elastic force of the tensile spring 66 (see FIGS. 11 and 12). Furthermore, in this way, the length L between the first and second rotary coupling points X1 and X2 is increased, and thus the shaft-shaped engagement portion 51 of the vehicle body-side engagement portion 42 seemingly slides from an opening side toward a depth side in the guide groove 57 of the door-side engagement portion 41, i.e., from a tip side toward a base end side of each of the engagement claws 55 and 55. Then, in this way, the vehicular door device 20 according to the present embodiment is configured in such a way that the door 5 performs a full closing operation in a manner in which the front end portion 5f side makes a linear slide track Rs followed by a movement (see FIGS. 3 and 10, from upper side toward lower side in each diagram) of the rear end portion 5r side toward the inside in the vehicle width direction.

On the other hand, during the opening operation from the state where the door 5 is located in the full closed position P0, the expansion mechanism 60 provided in the second link arm 12 contracts based on a force for causing the door 5 to perform the opening operation. Further, in this way, the length L between the first and second rotary coupling points X1 and X2 is shortened, and thus the shaft-shaped engagement portion 51 of the vehicle body-side engagement portion 42 seemingly slides from the depth side toward the opening side in the guide groove 57 of the door-side engagement portion 41, i.e., from the base end side toward the tip side of each of the engagement claws 55 and 55. Then, in this way, the vehicular door device 20 according to the present embodiment is configured in such a way that the door 5 performs the opening operation in a manner in which the front end portion 5*f* side makes the linear slide track Rs followed by a movement (see FIGS. 3 and 10, from lower side toward upper side in each diagram) of the rear end portion 5*r* side toward the outside in the vehicle width direction.

Furthermore, in the vehicular door device 20 according to the present embodiment, a biasing force in a direction of causing the door 5 located in the full closed position P0 to perform the opening operation is provided to the door 5, based on a spring force of the tensile spring 66 provided in the expansion mechanism 60. Thus, by an unlocking operation of the front lock 47 and the rear lock 48 constituting the full closed lock, the door 5 performs the opening operation from the full closed position P0 by making the slide track Rs as described above without waiting for a driving force of the actuator 25 or a manual operation force being provided. Then, in this way, the vehicular door device 20 according to the present embodiment is configured to provide a so-called pop-up function to the door 5.

For more detailed description, as illustrated in FIGS. 1 and 2, in the vehicle 1 according to the present embodiment, such a vehicular door device 20 is applied to a rear door 70. Further, as illustrated in FIGS. 13 to 15, the door 5 having a configuration as the rear door 70 includes, on the front end portion 5*f*, a hemming processed portion 71 protruding toward the vehicle front side. Specifically, the hemming processed portion 71 has a bent plate shape in such a way as to hem the front end portion 5*f* of the door 5 in the up-down direction by performing pressing on a metal plate forming the door 5 in a folded manner. Furthermore, in the vehicle 1 according to the present embodiment, a rear end portion 72*r* of a front door 72 disposed at front of the door 5 (right side in each diagram) is also provided with a similar hemming processed portion 73 protruding toward the vehicle rear side (left side in each diagram). Then, the vehicle 1 according to the present embodiment is configured in such a way that, when both of the rear door 70 and the front door 72 are in a full closed state, the hemming processed portion 71 provided on the front end portion 5*f* of the door 5 constituting the rear door 70 is disposed inside in the vehicle width direction (lower side in each diagram) of the hemming processed portion 73 provided on the rear end portion 72*r* of the front door 72.

In other words, in the vehicle 1 according to the present embodiment, the hemming processed portions 71 and 73 are alternately disposed in the vehicle width direction (up-down direction in each diagram). Thus, there is a risk that the hemming processed portions 71 and 73 interfere with each other when the door 5 performs the closing operation to the full closed position P0 by making the arc-shaped glide track Rg.

However, as described above, during the full closing operation of the door 5, the vehicular door device 20 according to the present embodiment causes the door 5 to perform the closing operation to the full closed position P0 in a manner in which the arc-shaped glide track Rg is shifted to the linear slide track Rs. Further, during the opening operation from the full closed position P0, the vehicular door device 20 causes the door 5 to perform the opening operation in a manner in which the slide track Rs is contrarily shifted to the glide track Rg. Then, in this way, the vehicular door device 20 according to the present embodiment is configured in such a way as to avoid interference between the hemming processed portion 71 provided on the front end portion 5*f* of the door 5 constituting the rear door 70 of the vehicle 1 and the hemming processed portion 73 provided on the rear end portion 72*r* of the front door 72.

Next, action of the present embodiment will be described.

In other words, in the vehicular door device 20 according to the present embodiment, when the door 5 is located near the full closed position P0, the shaft-shaped engagement portion 51 on the vehicle body-side engagement portion 42 side is disposed in the guide groove 57 of the door-side engagement portion 41 that includes a pair of the side wall portions 57*s* and 57*s* facing each other in the vehicle width direction and extends in the opening-closing operation direction of the door 5. Then, in this way, displacement of the door 5 in the vehicle width direction is regulated.

Further, the length L between the first and second rotary coupling points X1 and X2 in the second link arm 12 changes based on an operation of the expansion mechanism 60 provided in the second link arm 12, and thus a posture of the door 5 supported by the link mechanism 15 formed of the first and second link arms 11 and 12 changes. Furthermore, at this time, the shaft-shaped engagement portion 51 on the vehicle body-side engagement portion 42 side disposed in the guide groove 57 of the door-side engagement portion 41 seemingly slides along the extending direction of the guide groove 57 extending in the opening-closing operation direction of the door 5. Then, in this way, in the vehicular door device 20 according to the present embodiment, the door 5 performs the opening-closing operation while being stably supported even when the door 5 is located near the full closed position P0.

Next, effects of the present embodiment will be described.

(1) The vehicular door device 20 includes the first link arm 11 and the second link arm 12 including the first rotary coupling point X1 with respect to the vehicle body 2 and the second rotary coupling point X2 with respect to the door 5 of the vehicle 1. Further, the vehicular door device 20 includes the door-side engagement portion 41 provided on the closed-side end portion 45 of the door 5 that opens and closes the door opening 3 of the vehicle 1, based on an operation of the link mechanism 15 formed of the first link arm 11 and the second link arm 12. Furthermore, the vehicular door device 20 includes the vehicle body-side engagement portion 42 provided on the closed-side end portion 46 of the door opening 3 to and from which the closed-side end portion 45 of the door 5 is brought closer/ away, i.e., closer or away, based on the opening-closing operation of the door 5. Then, the vehicular door device 20 includes the expansion mechanism 60 provided in the second link arm 12, and configured to change the length between the first rotary coupling point X1 and the second rotary coupling point X2.

Further, the vehicle body-side engagement portion 42 includes the shaft-shaped engagement portion 51 extending in the up-down direction of the vehicle 1, and the door-side engagement portion 41 includes the guide groove 57 that includes a pair of the side wall portions 57*s* and 57*s* facing each other in the vehicle width direction and extends in the opening-closing operation direction of the door 5. Furthermore, in the opening-closing operation position near the full closed position P0 of the door 5 where the door-side engagement portion 41 and the vehicle body-side engagement portion 42 engage with each other, the shaft-shaped engagement portion 51 is disposed in the guide groove 57. Then, the shaft-shaped engagement portion 51 is relatively displaced along the extending direction of the guide groove 57 due to a change in length between the first rotary coupling point X1 and the second rotary coupling point X2, based on an operation of the expansion mechanism 60, and thus the door 5 is configured to perform the opening-closing operation.

According to the configuration described above, the shaft-shaped engagement portion 51 is disposed in the guide groove 57, and thus displacement of the door 5 in the vehicle width direction is regulated. Then, in this way, the door 5 can be stably supported even in the opening-closing operation position near the full closed position P0 where the first and second link arms 11 and 12 are more likely to be brought closer and be linearly aligned. Furthermore, in a state where the door-side engagement portion 41 and the vehicle body-side engagement portion 42 engage with each other, an opening-closing operation track of the door 5 changes from the arc-shaped glide track Rg to the linear slide track Rs, based on an operation of the expansion mechanism 60. Then, in this way, the door 5 can be smoothly caused to perform the closing operation to the full closed position and perform the opening operation from the full closed position. For example, even when the closed-side end portion 45 of the door 5 is provided with the hemming processed portion 71 having a bent plate shape in such a way as to hem the closed-side end portion 45 in the up-down direction, there is an advantage that the hemming processed portion 71 is less likely to interfere with another adjacent door and an edge portion of the vehicle body in the full closed state of the door 5.

(2) Furthermore, the closed-side end portion 46 of the door opening 3 is provided with the shaft-shaped engagement portion 51, and thus the vehicle body-side engagement portion 42 is less likely to get in the way of a user when the user gets on and off the vehicle 1. Then, in this way, convenience can be improved.

(3) The door-side engagement portion 41 includes the two engagement claws 55 and 55 that extend in the opening-closing operation direction of the door 5 and are aligned in the vehicle width direction. Then, the guide groove 57 is formed between the two engagement claws 55 and 55.

According to the configuration described above, the guide groove 57 that includes a pair of the side wall portions 57s and 57s facing each other in the vehicle width direction and extends in the opening-closing operation direction of the door 5 can be easily formed with a simple configuration. Then, a peripheral structure of the guide groove 57 can be made compact.

(4) The shaft-shaped engagement portion 51 has a configuration as the roller 52 being rotatably supported. According to the configuration described above, the shaft-shaped engagement portion 51 can be more smoothly displaced relatively while the shaft-shaped engagement portion 51 is in contact with and slides on the both side wall portions 57s and 57s of the guide groove 57 sandwiching the shaft-shaped engagement portion 51 in the vehicle width direction.

(5) The first link arm 11 includes the second rotary coupling point X2 coupled to the door 5 in the position closer to the center of gravity G of the door 5 than the second link arm 12. Then, the vehicular door device 20 has a configuration in which the expansion mechanism 60 is provided only in the second link arm 12.

According to the configuration described above, the first link arm 11 positioned as the main link 21 that supports a greater load can stably support the door 5. Then, in the opening-closing operation position near the full closed position P0, the door 5 can be caused to perform the opening-closing operation, based on an operation of the expansion mechanism 60 provided in the second link arm 12 in which a door load acting is relatively small.

(6) The second link arm 12 includes the second rotary coupling point X2 coupled to the door 5 in the position closer to the closed-side end portion 45 of the door 5 than the first link arm 11. Then, the expansion mechanism 60 includes the tensile spring 66 as the biasing member 65 that provides a tensile force in the direction of reducing the length L between the first and second rotary coupling points X1 and X2.

According to the configuration described above, the length L between the first and second rotary coupling points X1 and X2 is increased, i.e., the second link arm 12 extends, based on an operation of the expansion mechanism 60, and thus the door 5 moves to the full closed position P0. Further, the length L between the first and second rotary coupling points X1 and X2 in the second link arm 12 is shortened, i.e., the second link arm 12 contracts, and thus the door 5 performs the opening operation from the full closed position. Furthermore, when engagement between the door-side engagement portion 41 and the vehicle body-side engagement portion 42 is released during the opening-closing operation of the door 5, a state where the length L between the first and second rotary coupling points X1 and X2 is shortened, i.e., the second link arm 12 contacts, based on a tensile force of the biasing member 65, is held. Then, in this way, the door 5 can be stably caused to perform the opening-closing operation.

Furthermore, during the unlocking operation of the full closed lock that holds the door 5 in the full closed position P0, the door 5 can be caused to perform the opening operation from the full closed position P0, based on a tensile force of the biasing member 65. Then, in this way, a so-called pop-up function can be provided to the door 5.

(7) The vehicular door device 20 includes the driving arm 23 that includes the third rotary coupling point X3 in the position between the first rotary coupling point X1 and the second rotary coupling point X2, and is coupled to the first link arm 11. Then, the vehicular door device 20 includes the actuator 25 that drives the link mechanism 15 by providing a driving force to the driving arm 23 to rotate the driving arm 23.

According to the configuration described above, the power door device 30 that causes the door 5 to perform the opening-closing operation, based on a driving force of the actuator 25, can be formed with a simple and compact configuration. In addition, a degree of flexibility in an arrangement of the actuator 25 can be secured.

For example, the actuator 25 is disposed in a dead space below the first link arm 11 and between the first link arm 11 and the second link arm 12, and thus a greater in-vehicle space can be secured. Further, the actuator 25 is disposed on the vehicle body 2 side, and thus weight reduction of the door 5 can be achieved. Then, by driving the first link arm 11 having a configuration as the main link 21, the door 5 can be stably opened and closed while achieving weight reduction and a low cost.

(8) The driving arm 23 includes the protruding engagement portion 33 having a shaft shape. Further, the first link arm 11 is provided with the recessed engagement portion 34 having a long hole shape. Then, the protruding engagement portion 33 and the recessed engagement portion 34 engage with each other, and thus the third rotary coupling point X3 is formed.

According to the configuration described above, assemblability can be improved. For example, after assembly of the first and second link arms 11 and 12 and fitting of the door 5 with respect to the door opening 3, assembly of the actuator 25 can be performed. Further, in this way, a coating step of the door 5 and the first and second link arms 11 and 12 is facilitated. Furthermore, displacement between the first link arm 11 and the driving arm 23 in an axis line direction of the protruding engagement portion 33 can be absorbed in the engagement portion between the protruding engagement portion 33 and the recessed engagement portion 34. Then, in this way, the door 5 can be smoothly driven to open and close with a simple configuration.

(9) The recessed engagement portion 34 is formed by attaching the bush 37 having the long hole 37*x* to the recessed attachment portion 36 provided on the first link arm 11. Then, the bush 37 is formed by using a soft material such as resin, rubber, or an elastomer, for example. In this way, for example, during a change in an opening-closing speed of the door 5 and a load on the door 5, hitting sound generated by contact between the first link arm 11 and the driving arm 23 can be suppressed, and a high degree of quietness can be secured.

Note that the embodiment described above can be performed by making a modification as follows. The embodiment described above and the following modification example can be combined as long as they are not technically inconsistent.

In the embodiment described above, the first link arm 11 having a configuration as the main link 21 is disposed above the second link arm 12 having a configuration as the sub-link 22. Then, the second link arm 12 is disposed in the position closer to the closed-side end portion 45 of the door 5 than the first link arm 11. However, this is not restrictive, and a configuration in which the second link arm 12 is provided above the first link arm 11 may be adopted.

Further, a configuration in which the first link arm 11 is disposed in the position closer to the closed-side end portion 45 of the door 5 than the second link arm 12 may be adopted. Then, in this case, the expansion mechanism 60 may be configured in such a way that the door 5 performs the closing operation to the full closed position P0 while the second link arm 12 contracts.

In the embodiment described above, the expansion mechanism 60 is provided only in the second link arm 12, but the expansion mechanism 60 may be provided in the first link arm 11. Then, the expansion mechanism 60 may be provided in both of the first and second link arms 11 and 12. In other words, a configuration and an arrangement of the expansion mechanism 60 may be set in such a way that, among the first and second link arms 11 and 12, the closer one to the closed-side end portion 45 of the door 5 extends, the farther one contracts, or the closer one extends and the farther one contracts when the door 5 performs the closing operation to the full closed position P0.

In the embodiment described above, the expansion mechanism 60 includes the tensile spring 66 as the biasing member 65 that provides a tensile force in the direction of reducing the length L between the first and second rotary coupling points X1 and X2. However, this is not restrictive, and a configuration of the biasing member 65 may be optionally modified to an elastic member other than the tensile spring 66, a gas type, an electromagnetic type, or the like, for example. Further, as indicated in the other example described above, in a configuration in which the door 5 moves to the full closed position P0 in a manner in which the farther one of the first and second link arms 11 and 12 from the closed-side end portion 45 of the door 5 contracts, the biasing member 65 that generates a biasing force in a direction of increasing the length L between the first and second rotary coupling points X1 and X2, such as a compression spring, for example, may be used. Then, a configuration in which the expansion mechanism 60 that does not include such a biasing member 65 may be adopted.

In the embodiment described above, the shaft-shaped engagement portion 51 has a configuration as the roller 52 being rotatably supported, but the shaft-shaped engagement portion 51 may not be necessarily rotated.

In the embodiment described above, the door 5 is provided with the front lock 47 and the rear lock 48 having a configuration as the full closed lock that holds the door 5 in the full closed position. Then, the door-side engagement portions 41 and 41 are provided in the two positions separated in the up-down direction across the front lock 47.

However, this is not restrictive, and the number and an arrangement of the door-side engagement portion 41 may be optionally modified. Note that the number and an arrangement of the vehicle body-side engagement portion 42 may match with the door-side engagement portion 41. Further, for example, a configuration in which the front lock 47 is eliminated by using an engagement force of the door-side engagement portion 41 and the vehicle body-side engagement portion 42 for holding the door 5 may be adopted. In this way, there is an advantage that a fitting adjustment to the door 5 is facilitated.

The vehicle body-side engagement portion 42 includes the shaft-shaped engagement portion 51 extending in the up-down direction of the vehicle 1, and the door-side engagement portion 41 includes the guide groove 57 that includes a pair of the side wall portions 57*s* and 57*s* facing each other in the vehicle width direction and extends in the opening-closing operation direction of the door 5.

Figure 16:
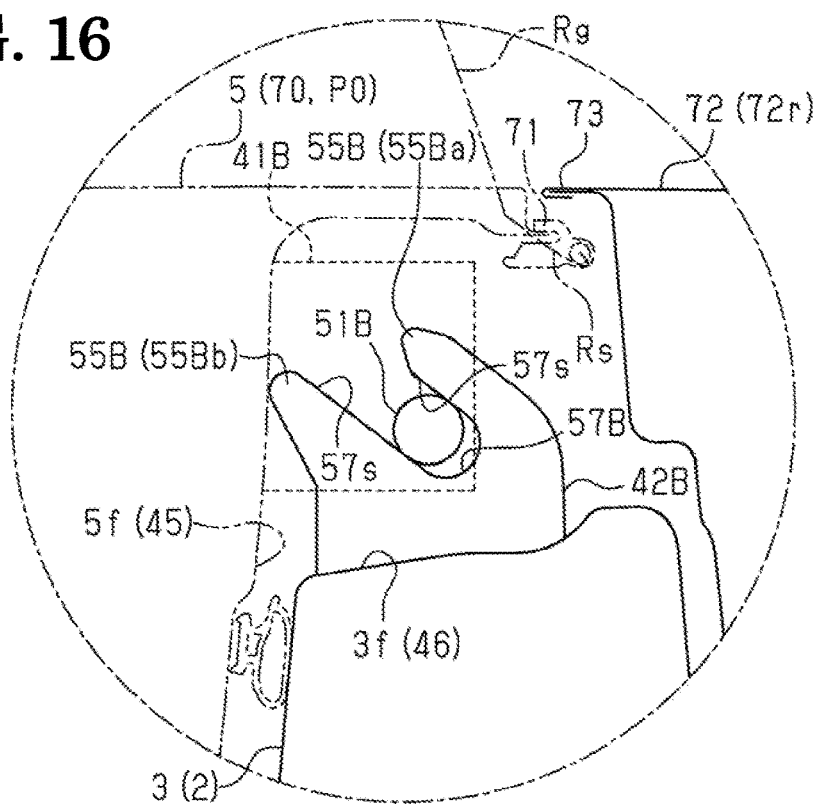
FIG. 16 is an enlarged view illustrating a door-side engagement portion and a vehicle body-side engagement portion in another example.

However, this is not restrictive, and, as illustrated in FIG. 16, a configuration in which a door-side engagement portion 41B includes a shaft-shaped engagement portion 51B, and a vehicle body-side engagement portion 42B includes a guide groove 57B that includes a pair of side wall portions 57*s* and 57*s* facing each other in the vehicle width direction and extends in the opening-closing operation direction of the door 5 may be adopted.

Specifically, in the vehicle body-side engagement portion 42B illustrated in FIG. 16, the guide groove 57B is also formed between two engagement claws 55B and 55B aligned in the vehicle width direction. Further, in this case, a greater protruding amount may be set to an inner engagement claw 55Bb disposed inside in the vehicle width direction than an outer engagement claw 55Ba disposed outside in the vehicle width direction. In other words, the outer engagement claw 55Ba may be set shorter than the inner engagement claw 55Bb. In this way, the door-side engagement portion 41B that moves in the closing operation direction integrally with the door 5 by making the arc-shaped glide track Rg can smoothly engage with the vehicle body-side engagement portion 42B. Then, in this way, in comparison with the embodiment described above, by adopting the configuration in which shapes of the door-side engagement portion 41B and the vehicle body-side engagement portion 42B are switched, there is an advantage of suppressing a substantially J-shaped overstroke formed in the slide track Rs when the door-side engagement portion 41B and the vehicle body-side engagement portion 42B are in an engaged state, i.e., a surplus operation of the door 5.

Figure 17:
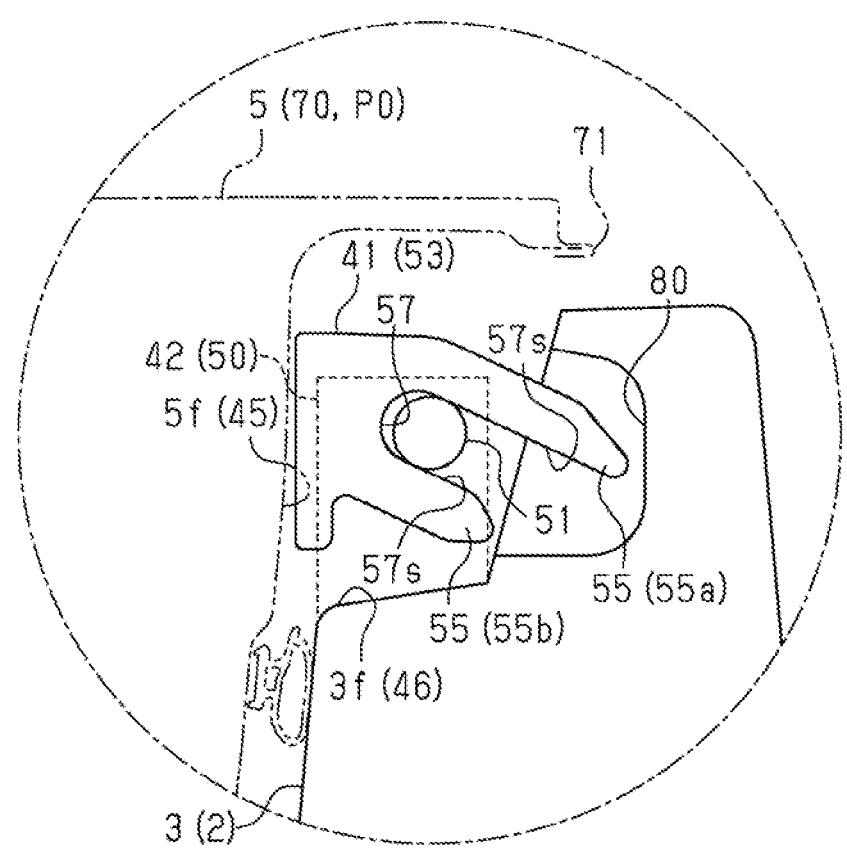
FIG. 17 is an enlarged view illustrating a door-side engagement portion and a vehicle body-side engagement portion in another example.

Further, as illustrated in FIG. 17, a configuration including a recessed portion 80 in which at least any one of the engagement claws 55 and 55 forming the guide groove 57 is disposed when the shaft-shaped engagement portion 51 and the guide groove 57 are in an engaged state may be adopted. In other words, in the example illustrated in FIG. 17, similarly to the embodiment described above, the vehicle body-side engagement portion 42 includes the shaft-shaped engagement portion 51, and the door-side engagement portion 41 includes the two engagement claws 55 and 55. Furthermore, the recessed portion 80 is formed on the closed-side end portion 46 of the door opening 3 provided with the vehicle body-side engagement portion 42. Then, by adopting such a configuration, when the door 5 is located in the full closed position P0, a gap formed between the closed-side end portion 45 of the door 5 and the closed-side end portion 46 of the door opening 3 can be suppressed to be small.

In the embodiment described above, the guide groove 57 is formed between the two engagement claws 55 and 55 aligned in the vehicle width direction, but a structure for forming the guide groove 57 may be optionally modified. For example, a configuration in which the guide groove 57 is formed between two members having a shape different from that of each of the engagement claws 55 and 55 in the embodiment described above may be adopted. Then, a configuration in which the guide groove 57 is recessed in one member may be adopted.

In the embodiment described above, the protruding engagement portion 33 having a shaft shape is provided on the driving arm 23, and the recessed engagement portion 34 having a long hole shape is provided on the first link arm 11. Then, the protruding engagement portion 33 and the recessed engagement portion 34 engage with each other, and thus the third rotary coupling point X3 is formed. However, this is not restrictive, and a configuration in which the recessed engagement portion 34 is provided on the driving arm 23 and the protruding engagement portion 33 is provided on the first link arm 11 may be adopted.

Further, in the embodiment described above, the recessed engagement portion 34 is formed by attaching the bush 37 formed of a soft material and having the long hole 37x to the recessed attachment portion 36 provided on the first link arm 11. However, this is not restrictive, and a structure of the third rotary coupling point X3 may be optionally modified. For example, a material of the protruding engagement portion 33 and the recessed engagement portion 34 may be optionally modified. Further, for example, a tip of the protruding engagement portion 33 has a ball shape, and the recessed engagement portion 34 also has a shape in which the ball shape fits. Then, by adopting such a configuration, a positional relationship of a "twist" generated between the driving arm 23 and the first link arm 11 can be absorbed.

In the embodiment described above, the driving arm 23 and the actuator 25 drive the first link arm 11 having a configuration as the main link 21. However, this is not restrictive, and the second link arm 12 having a configuration as the sub-link 22 may be driven. Then, a configuration in which both of the first and second link arms 11 and 12 are driven may be adopted.

In other words, the number and an arrangement of the driving arm 23 and the actuator 25 may be optionally modified. For example, the actuator 25 may be disposed above the first link arm 11 or below the second link arm 12. Further, the actuator 25 may be disposed on the door 5 side. Then, the actuator 25 may be disposed on both of the vehicle body 2 side and the door 5 side.

In the embodiment described above, this disclosure is applied to a configuration in which the door 5 of the vehicle 1 performs the opening operation toward the vehicle rear side, but may be applied to a configuration in which the door 5 performs the opening operation toward the vehicle front side. Further, this disclosure may be applied to a configuration in which the support shafts N1a and N1b and the support shafts N2a and N2b of the first and second link arms 11 and 12 are inclined. Then, this disclosure may be applied to a manual door device that does not include a driving source such as the actuator 25.

A vehicular door device that solves the problem described above includes a first link arm and a second link arm including a first rotary coupling point with respect to a vehicle body and a second rotary coupling point with respect to a door of a vehicle, a door-side engagement portion provided on a closed-side end portion of the door that opens and closes a door opening of the vehicle, based on an operation of a link mechanism formed of the first link arm and the second link arm, a vehicle body-side engagement portion provided on a closed-side end portion of the door opening to and from which the closed-side end portion of the door is brought closer and away, based on an opening-closing operation of the door, and an expansion mechanism provided in at least any of the first link arm and the second link arm, and configured to change a length between the first rotary coupling point and the second rotary coupling point. One of the door-side engagement portion and the vehicle body-side engagement portion includes a shaft-shaped engagement portion extending in an up-down direction of the vehicle. The other of the door-side engagement portion and the vehicle body-side engagement portion includes a guide groove that includes a pair of side wall portions facing each other in a vehicle width direction and extends in an opening-closing operation direction of the door. In an opening-closing operation position near a full closed position of the door where the door-side engagement portion and the vehicle body-side engagement portion engage with each other, the shaft-shaped engagement portion is disposed in the guide groove, and the shaft-shaped engagement portion is also relatively displaced along an extending direction of the guide groove while a change in length between the first rotary coupling point and the second rotary coupling point, based on an operation of the expansion mechanism, is accompanied, and thus the door is configured to perform the opening-closing operation.

According to the configuration described above, the shaft-shaped engagement portion is disposed in the guide groove, and thus displacement of the door in the vehicle width direction is regulated. Then, in this way, the door can be stably supported even in the opening-closing operation position near the full closed position where the first and second link arms are more likely to be brought closer and be linearly aligned. Furthermore, in a state where the door-side engagement portion and the vehicle body-side engagement portion engage with each other, an opening-closing operation track of the door changes from the arc-shaped glide track to the linear slide track, based on an operation of the expansion mechanism. Then, in this way, the door can be smoothly caused to perform the closing operation to the full closed position and perform the opening operation from the full closed position.

In the vehicular door device that solves the problem described above, the door-side engagement portion may include the guide groove, and the vehicle body-side engagement portion may include the shaft-shaped engagement portion.

According to the configuration described above, the vehicle body-side engagement portion is less likely to get in the way of a user when the user gets on and off the vehicle. Then, in this way, convenience can be improved.

In the vehicular door device that solves the problem described above, the door-side engagement portion may include the shaft-shaped engagement portion, and the vehicle body-side engagement portion may include the guide groove.

According to the configuration described above, there is an advantage of suppressing a substantially J-shaped overstroke formed in the slide track when the door-side engagement portion and the vehicle body-side engagement portion are in an engaged state, i.e., a surplus operation of the door.

In the vehicular door device that solves the problem described above, the guide groove may be formed between two engagement claws that extend in the opening-closing operation direction of the door and are aligned in the vehicle width direction.

According to the configuration described above, the guide groove that includes a pair of the side wall portions facing each other in the vehicle width direction and extends in the opening-closing operation direction of the door can be easily formed with a simple configuration. Then, a peripheral structure of the guide groove can be made compact.

In the vehicular door device that solves the problem described above, the shaft-shaped engagement portion may be rotatably supported.

According to the configuration described above, the shaft-shaped engagement portion can be more smoothly displaced relatively while the shaft-shaped engagement portion is in contact with and slides on both side wall portions of the guide groove sandwiching the shaft-shaped engagement portion in the vehicle width direction.

In the vehicular door device that solves the problem described above, the first link arm may include the second rotary coupling point coupled to the door in a position closer to a center of gravity of the door than the second link arm, and the expansion mechanism may be provided only in the second link arm.

According to the configuration described above, the first link arm positioned as a main link that supports a greater load can stably support the door. Then, in the opening-closing operation position near the full closed position, the door can be caused to perform the opening-closing operation, based on an operation of the expansion mechanism provided in the second link arm in which a load is relatively small.

In the vehicular door device that solves the problem described above, the second link arm may include the second rotary coupling point coupled to the door in a position closer to the closed-side end portion of the door than the first link arm, and the expansion mechanism may include a biasing member that provides a tensile force in a direction of reducing a length between the first rotary coupling point and the second rotary coupling point.

According to the configuration described above, the length between the first and second rotary coupling points in the second link arm is increased, i.e., the second link arm extends, based on an operation of the expansion mechanism, and thus the door moves to the full closed position. Further, the length between the first and second rotary coupling points in the second link arm is shortened, i.e., the second link arm contracts, and thus the door performs the opening operation from the full closed position. Furthermore, when engagement between the door-side engagement portion and the vehicle body-side engagement portion is released during the opening-closing operation of the door, a state where the length between the first and second rotary coupling points in the second link arm is shortened, i.e., the second link arm contacts, based on a tensile force of the biasing member, is held. Then, in this way, the door can be stably caused to perform the opening-closing operation.

Furthermore, during the unlocking operation of the full closed lock that holds the door in the full closed position, the door can be caused to perform the opening operation from the full closed position, based on a tensile force of the biasing member. Then, in this way, a so-called pop-up function can be provided to the door.

The vehicular door device that solves the problem described above may further include a driving arm that includes a third rotary coupling point in a position between the first rotary coupling point and the second rotary coupling point, and is coupled to at least any of the first link arm and the second link arm, and an actuator that drives the link mechanism by providing a driving force to the driving arm and rotating the driving arm.

According to the configuration described above, the power door device that causes the door to perform the opening-closing operation, based on a driving force of the actuator, can be formed with a simple and compact configuration. In addition, a degree of flexibility in an arrangement of the actuator can be secured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicular door device comprising:
a first link arm and a second link arm that include a first rotary coupling point with respect to a vehicle body and a second rotary coupling point with respect to a door of a vehicle;
a door-side engagement portion provided on a closed-side end portion of the door that opens and closes a door opening of the vehicle, based on an operation of a link mechanism formed of the first link arm and the second link arm;
a vehicle body-side engagement portion provided on a closed-side end portion of the door opening to and from which the closed-side end portion of the door is brought closer and away, based on an opening-closing operation of the door; and
an expansion mechanism provided in at least any of the first link arm and the second link arm, and configured to change a length between the first rotary coupling point and the second rotary coupling point, wherein
one of the door-side engagement portion and the vehicle body-side engagement portion includes a shaft-shaped engagement portion extending in an up-down direction of the vehicle,
another of the door-side engagement portion and the vehicle body-side engagement portion includes a guide groove that includes a pair of side wall portions facing each other in a vehicle width direction and extends in an opening-closing operation direction of the door, and,
in an opening-closing operation position near a full closed position of the door where the door-side engagement portion and the vehicle body-side engagement portion engage with each other, the shaft-shaped engagement portion is disposed in the guide groove, and the shaft-shaped engagement portion is also relatively displaced along an extending direction of the guide groove while a change in length between the first rotary coupling point and the second rotary coupling point, based on an operation of the expansion mechanism, is accompanied, and thus the door is configured to perform an opening-closing operation.

2. The vehicular door device according to claim 1, wherein
the door-side engagement portion includes the guide groove, and the vehicle body-side engagement portion includes the shaft-shaped engagement portion.

3. The vehicular door device according to claim 1, wherein
the door-side engagement portion includes the shaft-shaped engagement portion, and the vehicle body-side engagement portion includes the guide groove.

4. The vehicular door device according to claim 1, wherein
the guide groove is formed between two engagement claws that extend in the opening-closing operation direction of the door and are aligned in the vehicle width direction.

5. The vehicular door device according to claim 1, wherein
the shaft-shaped engagement portion is rotatably supported.

6. The vehicular door device according to claim 1, wherein
the first link arm includes the second rotary coupling point coupled to the door in a position closer to a center of gravity of the door than the second link arm, and
the expansion mechanism is provided only in the second link arm.

7. The vehicular door device according to claim 6, wherein
the second link arm includes the second rotary coupling point coupled to the door in a position closer to the closed-side end portion of the door than the first link arm, and
the expansion mechanism includes a biasing member that provides a tensile force in a direction of reducing a length between the first rotary coupling point and the second rotary coupling point.

8. The vehicular door device according to claim 1, further comprising:
a driving arm that includes a third rotary coupling point in a position between the first rotary coupling point and the second rotary coupling point, and is coupled to at least any of the first link arm and the second link arm; and
an actuator that drives the link mechanism by providing a driving force to the driving arm and rotating the driving arm.

* * * * *